United States Patent
Lim et al.

(10) Patent No.: US 8,455,121 B2
(45) Date of Patent: Jun. 4, 2013

(54) SYSTEM AND METHOD FOR ACTIVATING FUEL CELL

(75) Inventors: Tae Won Lim, Seoul (KR); Sae Hoon Kim, Gyeonggi-do (KR); Sang Yeoul Ahn, Seoul (KR); Bo Ki Hong, Seoul (KR); Byung Ki Ahn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 940 days.

(21) Appl. No.: 12/503,271

(22) Filed: Jul. 15, 2009

(65) Prior Publication Data

US 2010/0129689 A1    May 27, 2010

(30) Foreign Application Priority Data

Nov. 25, 2008   (KR) .......................... 10-2008-0117428

(51) Int. Cl.
    *H01M 8/04*    (2006.01)
(52) U.S. Cl.
    USPC ........................................................... 429/13
(58) Field of Classification Search
    None
    See application file for complete search history.

(56) References Cited

U.S. PATENT DOCUMENTS

| 2001/0028970 A1* | 10/2001 | Sano et al. ..................... 429/22 |
| 2005/0277010 A1 | 12/2005 | Lamont et al. |

FOREIGN PATENT DOCUMENTS

| JP | 2001-256988 A | 9/2001 |
| JP | 2005-340022 A | 12/2005 |
| JP | 2007-066666 A | 3/2007 |
| JP | 2007-172971 A | 7/2007 |
| JP | 2008-258120 A | 10/2008 |
| KR | 10-2002-0065118 | 8/2002 |

* cited by examiner

*Primary Examiner* — Monica Huson
(74) *Attorney, Agent, or Firm* — Edwards Wildman Palmer LLP; Peter F. Corless

(57) ABSTRACT

A system for activating a fuel cell includes a flow meter for measuring the amount of water discharged from an outlet of the air electrode and an outlet of the fuel electrode; a pressure sensor for measuring the pressure at the respective outlets; and a back pressure regulator receiving flow values measured by the flow meters and pressure values measured by the pressure sensors, which are fed back from a controller, and regulating a pressure difference ($\Delta P = P_{Cathode} - P_{Anode}$) to be a value greater than 0. With the system, the activation time of a fuel cell and the amount of hydrogen used for the activation can be reduced, thus improving the productivity and manufacturing cost.

4 Claims, 6 Drawing Sheets

SYSTEM AND METHOD FOR ACTIVATING FUEL CELL

CROSS-REFERENCE TO RELATED APPLICATION

This application claims under 35 U.S.C. §119(a) the benefit of Korean Patent Application No. 10-2008-0117428 filed Nov. 25, 2008, the entire contents of which are incorporated herein by reference.

BACKGROUND (a) Technical Field

The present disclosure relates to a system and method for activating a fuel cell. More particularly, it relates to a system and method for activating a fuel cell, which can reduce the activation time of a fuel cell and reduce the amount of hydrogen used for the activation, thus improving the productivity of a fuel cell stack and reducing manufacturing cost.

(b) Background Art

A fuel cell stack after assembly is required to be activated before being mounted on a vehicle. Otherwise, electrochemical reaction in the fuel cell does not occur to full extent during initial operation and the overall performance of the fuel cell stack is irreversibly deteriorated.

The activation of the fuel cell provides advantageous effects including, e.g., removal of impurities introduced during the process of manufacturing the membrane-electrode assembly and the fuel cell stack, activation of a catalyst which does not participate in the reaction, creation of a transfer passage of reactants to the catalyst, and hydration of electrolyte contained in an electrolyte membrane and an electrode to ensure a hydrogen ion passage.

As shown in FIG. 1, a conventional activation system includes an electronic load 12 connected between a fuel electrode ("anode" or "negative electrode) and an air electrode ("cathode" or "positive electrode") of a fuel cell stack 10, a pressure sensor 14 mounted on an outlet of each of the fuel electrode and the air electrode, and a controller 16 controlling the activation of the fuel cell stack 10.

According to a conventional method for activating a fuel cell, after humidified hydrogen and humidified air (oxygen) are supplied to the fuel electrode and to the air electrode, respectively, activation according to a load sequence is initiated under predetermined operating conditions (stoichiometric ratio of fuel gas to air, relative humidity, temperature, and pressure). As an electrochemical reaction occurs in the fuel cell stack according to the load sequence, the amount of water contained in a fluorine polymer electrolyte membrane is increased due to water produced at the air electrode and the humidified water supplied to the fuel gas, thereby performing the activation.

One of the most important requirements for successful activation of the fuel cell stack is to control the percentage of water content at a certain level. That is, the concentration gradient of water contained in the electrolyte membrane of the fuel cell stack must be small.

In an example, as shown in FIG. 2, the load is sequentially applied in the order of (1) OCV (15 min)→(2) 600 mV/cell (75 min)→850 mV/cell (20 min)→(4) 600 mV/cell (30 min) with the steps (3) and (4) repeated three times.

In another example, as shown in FIG. 3, the load sequentially applied in two processes, namely, a pre-process and a post-process. The pre-process is performed in the order of 100→900 mV/cell (each 100 mV/cell—2 min)→1,000 mV (30 min) and the post-process is performed in the order of 900→100 mV/cell (each 100 mV/cell—5 min).

The above-described conventional methods, however, have the following problems. First, it takes a long time to perform the activation due to limitations on utilization of product water of the fuel cell stack. That is, in the water transport according to an increase in load during operation of the fuel cell stack, the amount of water transported by electro-osmotic drag at the fuel electrode becomes larger than the amount of water transported by back diffusion at the air electrode, causing only the water concentration on the surface of the electrolyte membrane at the air electrode to increase. Due to this, water concentration gradient in the electrolyte membrane occurs. It thus takes a long time to perform the activation and the productivity of the fuel cells stack is significantly reduced.

Here, since the Nafion fluorine-containing polymer electrolyte membrane has a hydrophobic PTEE structure on a surface layer thereof and a hydrophilic sulfonic acid structure in an inner layer thereof, a large amount of humidified water supplied to the air electrode as fuel (air) is discharged as it is before it permeates into the inner layer. As a result, a water concentration gradient occurs on the surface of the electrolyte membrane at the fuel electrode and the air electrode. In view of this, since the water produced in the fuel cell stack by the reaction is present in the inner layer of the electrolyte membrane having hydrophilic properties rather than the humidified water supplied as fuel, the product water is more advantageous for the activation than the humidified water.

Second, the amount of hydrogen used is increased. That is, since it takes a long time to activate the fuel cell stack, the amount of hydrogen fuel used is increased, and thus the cost for activating the fuel cell stack is increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a system for activating a fuel cell, in which an electrode load connected between a fuel electrode and an air electrode of the fuel cell stack and a controller controlling activation of the fuel cell stack are provided. The system may comprise a flow meter, a pressure sensor, and a back pressure regulator. The flow meter, the pressure sensor, and the back pressure regulator are mounted on the outlet of the air electrode and the outlet of the fuel electrode.

The flow meter measures the amount of water discharged from an outlet of each of the air electrode and the fuel electrode. The pressure sensor measures the pressure at the outlet of each of the air electrode and the fuel electrode. The back pressure regulator receives flow values measured by the flow meters and pressure values measured by the pressure sensors, which are fed back from the controller, and regulates a pressure difference between the air electrode and the fuel electrode to be a value greater than 0.

In another aspect, the present invention provides a method for activating a fuel cell, which comprises: initiating activation of a fuel cell stack by supplying hydrogen and air (oxygen) to a fuel electrode and an air electrode, respectively, under predetermined operation conditions; applying a predetermined load sequence to the fuel cell; regulating a pressure difference ($\Delta P = P_{Cathode} - P_{Anode}$) between the air electrode and the fuel electrode to be a value greater than 0; and terminating the activation when the amounts of water discharged from the fuel electrode and the air electrode are equal to each other and the current density of the fuel cell stack is stabilized at a constant level.

Other aspects and features of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
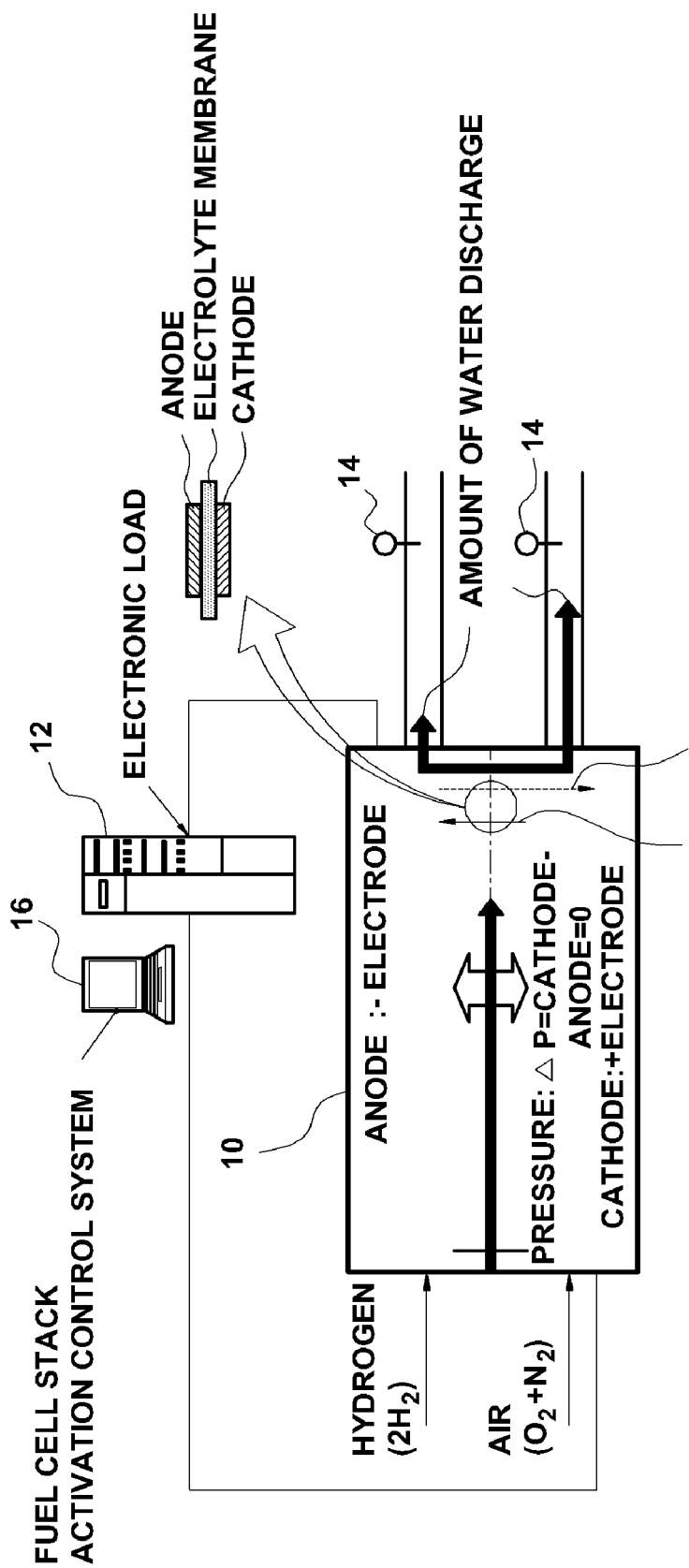
FIG. 1 is a schematic diagram showing a conventional system for activating a fuel cell.
Figure 2:
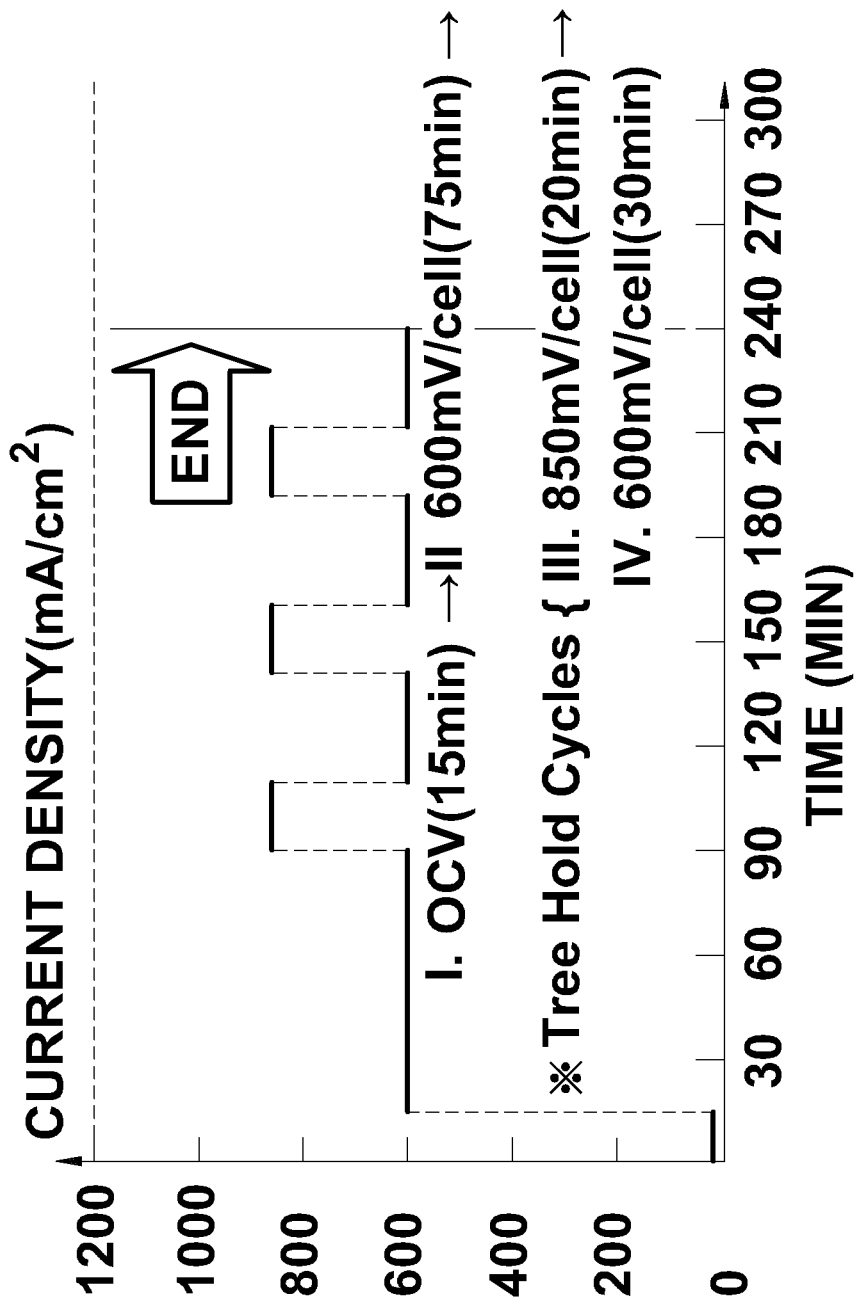
FIGS. 2 and 3 are graphs illustrating a conventional method for activating a fuel cell.

Reference numerals set forth in the Drawings includes reference to the following elements as further discussed below:

| 10: fuel cell stack | 12: electronic load |
| 14: pressure sensor | 16: controller |
| 18: back pressure regulator | 20: hydrogen sensor |
| 22: oxygen sensor | 24: flow meter |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention aims at providing a system and method for activating a fuel cell which can adjust the amounts of water discharged from an air electrode and a fuel electrode to be equal to each other by controlling a pressure difference between the air electrode and the fuel electrode during activation of the fuel cell and prevent a crossover phenomenon between air (oxygen) and hydrogen due to the pressure difference between the air electrode and the fuel electrode.

Figure 4:
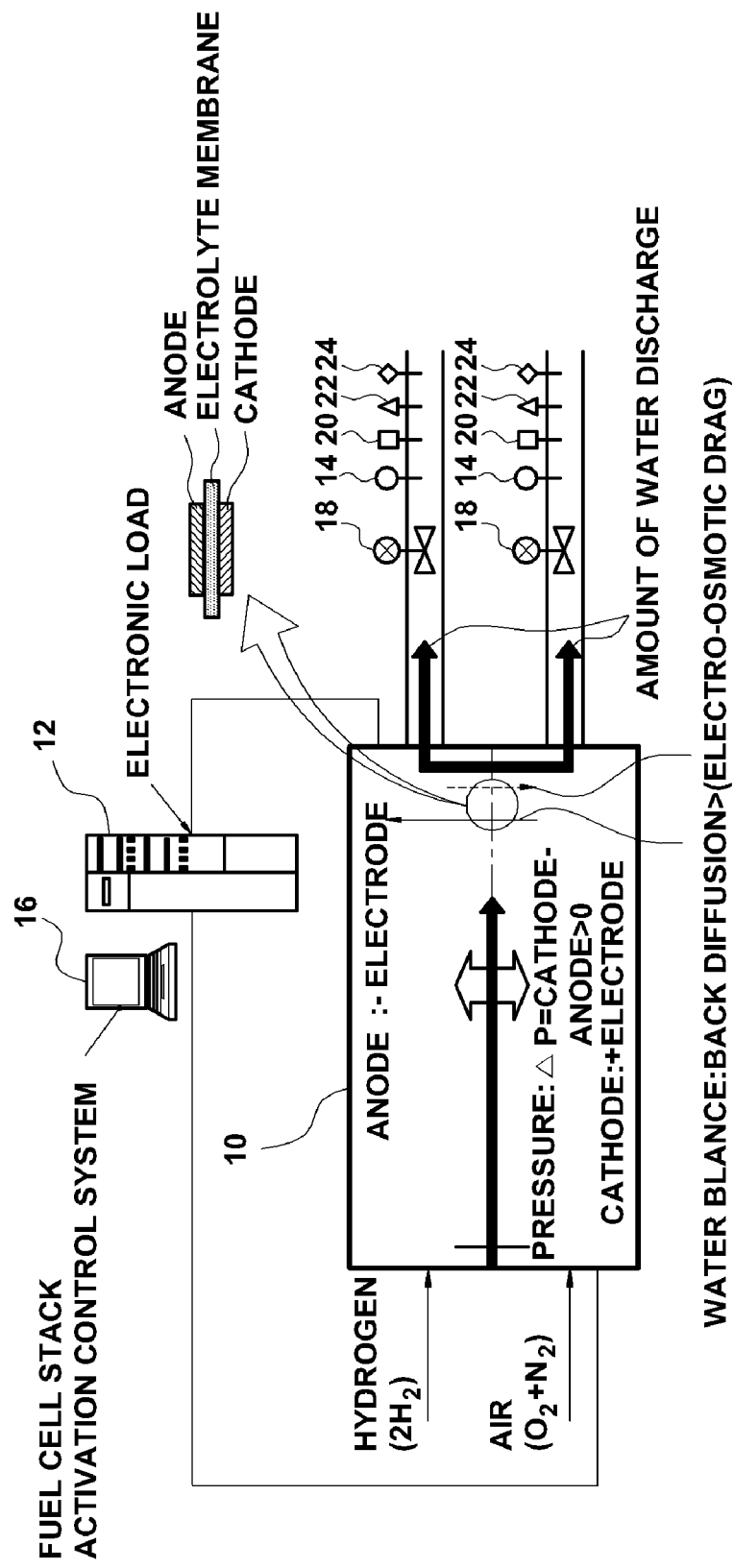
FIG. 4 is a schematic diagram showing a method for activating a fuel cell in accordance with the present invention.

A system for activating a fuel cell in accordance with an embodiment of the present invention for achieving the above objects is shown in FIG. 4.

Referring to FIG. 4, the system comprises an electronic load 12 connected between a fuel electrode ("anode" or "negative electrode) and an air electrode ("cathode" or "positive electrode") of a fuel cell stack 10, a pressure sensor 14 mounted on an outlet of each of the fuel electrode and the air electrode, a controller 16 controlling the activation of the fuel cell stack 10, a back pressure regulator 18 located at a position before the pressure sensor 14, a hydrogen sensor 20, an oxygen sensor 22, and a flow meter 24, which are located in parallel after the pressure sensor 14.

That is, according to the present invention, the back pressure regulator 18, the hydrogen sensor 20, the oxygen sensor 22, and the flow meter 24 are further provided in addition to the pressure sensor 14 at the outlet of each of the fuel electrode and the air electrode of the system for activating the fuel cell.

Thus, the amounts of water discharged from the air electrode and the fuel electrode are measured by the flow meters 24 provided at the outlets of the fuel electrode and the air electrode, the pressures at the outlets of the fuel electrode and the air electrode are measured by the pressure sensors 14, and the flow measurement values and the pressure measurement values are fed back to the controller 16 to transmit a signal to the back pressure regulator 18.

Then, the back pressure regulator 18 controls the pressure difference ($\Delta P = P_{Cathode} - P_{Anode}$) between the air electrode and the fuel electrode such that the amount of water transported by back diffusion at the air electrode becomes larger than the amount of water transported by electro-osmotic drag at the fuel electrode, thus adjusting the amounts of water discharged from the air electrode and the fuel electrode to be equal to each other.

At this time, a crossover phenomenon in which air (oxygen) at the air electrode crosses over to the fuel electrode, or hydrogen at the fuel electrode crosses over to the air electrode may be caused by the pressure difference ($\Delta P = P_{Cathode} - P_{Anode}$) between the air electrode and the fuel electrode.

When the air (oxygen) and hydrogen that have crossed over are discharged through the outlets of the fuel electrode and the air electrode together with water, the hydrogen and oxygen sensors 20 and 22 detect the same and, if the detected values exceed threshold values, the operation of the back pressure regulator 18 is stopped as a warning (safety) step.

Moreover, the crossover of the gases such as hydrogen and air (oxygen) due to the pressure difference between the air electrode and the fuel electrode can be checked by measuring a change in voltage in the system for activating the fuel cell.

In fact, when the water produced during the activation of the fuel cell permeates into the electrolyte membrane, the crossover of the fuel gases is extremely limited within a few ppm; however, the step of measuring the amount of gases that have crossed over in the above manner and warning the same by the hydrogen and oxygen sensors 20 and 22 is performed to ensure the safety.

Meanwhile, the system and method for activating the fuel cell in accordance with the present invention may be applicable to existing methods for activating fuel cells such as an activation method with no-load humidification, a constant current activation method, a load sequence activation method, etc.

For reference, the activation method with no-load humidification activates the fuel cell by supplying only humidified fuel to the fuel cell stack in a no-load state, the constant current activation method operates the fuel cell stack at a constant current, and the load sequence activation method activates the fuel cell in such a manner that a load is maintained for a predetermined period of time or increased at each current step from OCV (or low current) to high current and, then, the load is reduced at each current step from the maximum current to OCV. The load sequence activation method is most widely used.

A method for activating a fuel cell in accordance with an embodiment of the present invention based on the above-described system will be described in detail with reference to FIG. 5 below.

Figure 5:
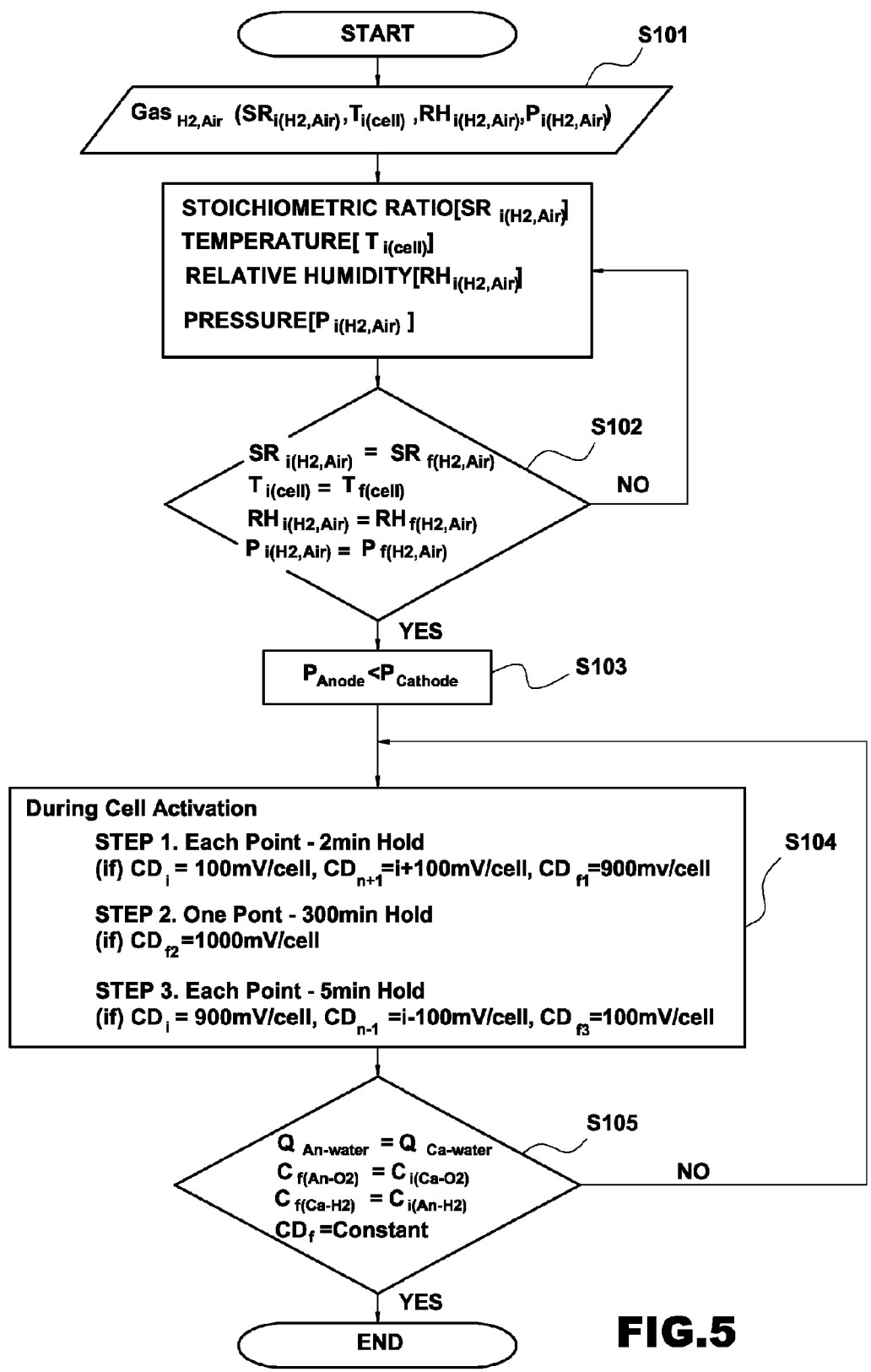
FIG. 5 is a flowchart illustrating a method for activating a fuel cell in accordance with the present invention.

FIG. 5 is a flowchart illustrating a method for activating a fuel cell in accordance with the present invention.

First, humidified hydrogen is supplied to the fuel electrode and humidified air (oxygen) is supplied to the air electrode such that the activation according to the load sequence is initiated under predetermined operating conditions (stoichiometric ratio of fuel gas to air, relative humidity, temperature, and pressure).

At this time, the initial set values of fuel cell operating variables (stoichiometric ratio of fuel gas to air, relative humidity, temperature, and pressure) are input to the controller controlling the activation of the fuel cell stack (S101).

Examples of the initial set value ranges are as follows:
1. Stoichiometric ratio of fuel gas to air [$Sr_{i(H2,Air)}$]: H2:Air=1 to 2:1.5 to 3;
2. Cell operation temperature of fuel cell stack [$T_{i(cell)}$]: 55° C. to 95° C.;
3. Relative humidity of fuel gases [$RH_{i(H2,Air)}$]: 25% to 100%; and
4. Pressure difference between air electrode and fuel electrode ($\Delta P=P_{Cathode}-P_{Anode}$): 0.1 to 2 bar.

Next, current values of the fuel cell operating variables (stoichiometric ratio of fuel gas to air, relative humidity, temperature, and pressure) are measured and compared with the initial set values (S102). If the measured values reach the initial set values, it is determined that the fuel cell operating variables are optimized, and thus the activation of the fuel cell stack is initiated.

On the contrary, if the measured values do not reach the initial set values, it is determined that the fuel cell operating variables are not optimized, and thus the activation of the fuel cell stack is not initiated until the respective variables reach the initial set values.

Here, an active load sequence for the activation is applied in steps at the same time as the activation of the fuel cell stack is initiated (S104). For example, as shown in FIG. 5, the active load sequence may be applied in three steps. That is, in the first step (Step 1), each cell voltage is increased from 100 mV to 900 mV and maintained for 2 minutes at each increase of 100 mV. In the second step (Step 2), each cell voltage is increased up to 1,000 mV and maintained for 30 minutes. In the third step (Step 3), each cell voltage is decreased from 900 mV to 100 mV and maintained for 5 minutes at each decrease of 100 mV.

At this time, the pressure difference ($\Delta P=P_{Cathode}-P_{Anode}$) between the air electrode and the fuel electrode is maintained at a value greater than 0, preferably, within a range of 0.1 to 2.0 bar (S103) such that the amounts of water discharged from the fuel electrode and the air electrode are adjusted to be equal to each other.

In more detail, the amounts of water discharged from the fuel electrode and the air electrode are measured by the flow meters mounted on the outlets thereof, and the pressure at the air electrode is increased using the back pressure regulator until the amounts of water discharged from the fuel electrode and the air electrode are adjusted to be equal to each other.

In other words, the pressure difference ($\Delta P=P_{Cathode}-P_{Anode}$) between the air electrode and the fuel electrode is adjusted to 0.1 to 2 bar such that the amount of water transported by back diffusion at the air electrode becomes larger than the amount of water transported by electro-osmotic drag at the fuel electrode. As a result, the amounts of water discharged from the fuel electrode and the air electrode are adjusted to be equal to each other.

Thereafter, if it is determined that the amounts of water discharged from the fuel electrode and the air electrode are equal to each other ($A_{An-water}=A_{Ca-water}$), the concentration changes in hydrogen and oxygen at the fuel electrode and the air electrode are equal to each other [$C_{f(An-O2)}=C_{i(Ca-O2)}$ and $C_{f(Ca-H2)}=C_{i(An-H2)}$], and the current density $CD_f$ of the fuel cell stack is in steady state at a constant level (S105), the activation is terminated.

In the even that there are concentration changes in hydrogen and oxygen at the fuel electrode and the air electrode, that is, if the values detected by the hydrogen and oxygen sensors mounted on the outlets of the fuel electrode and the air electrode exceed threshold values, the operation of the back pressure regulator is stopped as a warning (safety) step to reduce the pressure at the air electrode.

At this time, a crossover threshold value (limited range) of hydrogen and air, i.e., the crossover limited range of the oxygen concentration at the fuel electrode and the hydrogen concentration at the air electrode with respect to the Nafion fluorine-containing polymer electrolyte membrane is determined to be a value within a range changed to 1 to 10% compared to the initial concentration.

As described above, while the activation is performed by applying the active load sequence to the fuel cell stack, the pressure difference between the air electrode and the fuel electrode is controlled such that the amount of water transported by back diffusion becomes larger than the amount of water transported by electro-osmotic drag. Accordingly, the water produced at the air electrode is not discharged as it is, but is directly used in the activation of the Nafion fluorine-containing polymer electrolyte membrane such that the water concentration gradient of the polymer electrolyte membrane is minimized, thus reducing the activation time of the fuel cell stack.

The following examples illustrate the invention and are not intended to limit the same.

EXAMPLE

A fuel cell stack with 6 cells, which as active area of 250 cm$^2$, was prepared. Nafion fluorine-containing polymer electrolyte membrane was used and Pt/C catalyst was used at the fuel electrode and air electrode. The fuel cell stack is operated in the following conditions: fuel cell stack temperature of 70° C.; atmospheric pressure; SR ratio of $H_2$:Air of 1.2:1.8; and relative humidity of $H_2$:Air of 100%:100%.

Figure 3:
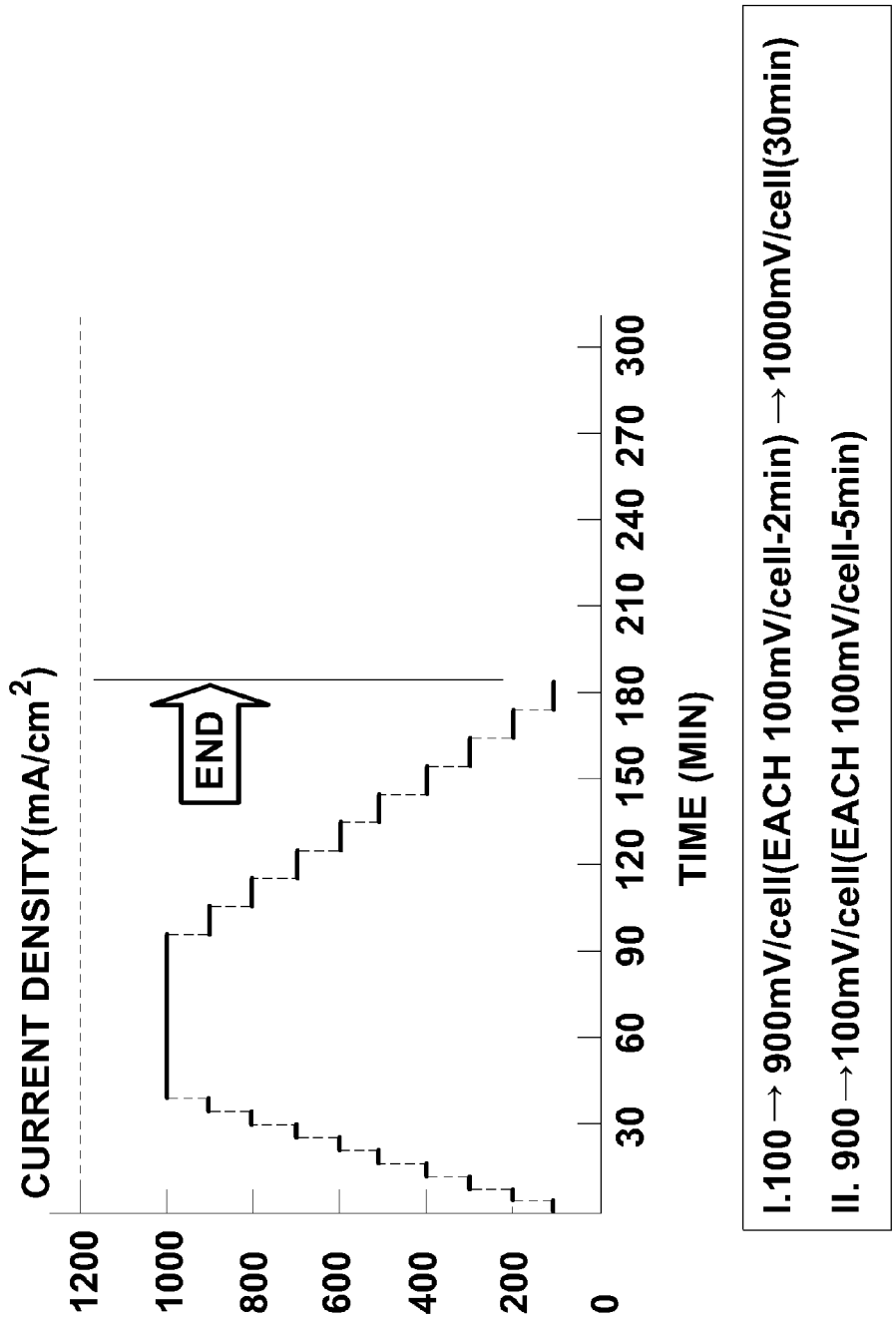

A load sequence was applied as described with reference to FIG. 3. That is, the load sequence was divided into a pre-process and a post-process, in which the pre-process was performed in the order of 100→900 mV/cell (each 100 mV/cell—2 min)→1,000 mV/cell (30 min), and the post-process was performed in the order of 900→100 mV/cell (each 100 mV/cell—5 min).

While the activation was performed by applying the active load sequence to the fuel cell stack as described above, the pressure difference between the air electrode and the fuel electrode was adjusted to 0.1 to 2.0 bar such that the amount of water transported by back diffusion became larger than the amount of water transported by electro-osmotic drag, and thus the amounts of water discharged from the fuel electrode and the air electrode were adjusted to be equal to each other.

COMPARATIVE EXAMPLE

The fuel cell stack was prepared and activated in the same manner as the Example, except the pressure difference between the fuel electrode and the air electrode was not adjusted.

In this Comparative Example, the amount of water transported by electro-osmotic drag at the fuel electrode became larger than the amount of water transported by back diffusion at the air electrode, and thus only the water concentration on the surface of the electrolyte membrane at the air electrode was increased.

TEST EXAMPLE

The activation time and the current density of the fuel cell stack at the time point when the activation was terminated in accordance with the Example and Comparative Example were measured.

Figure 6:
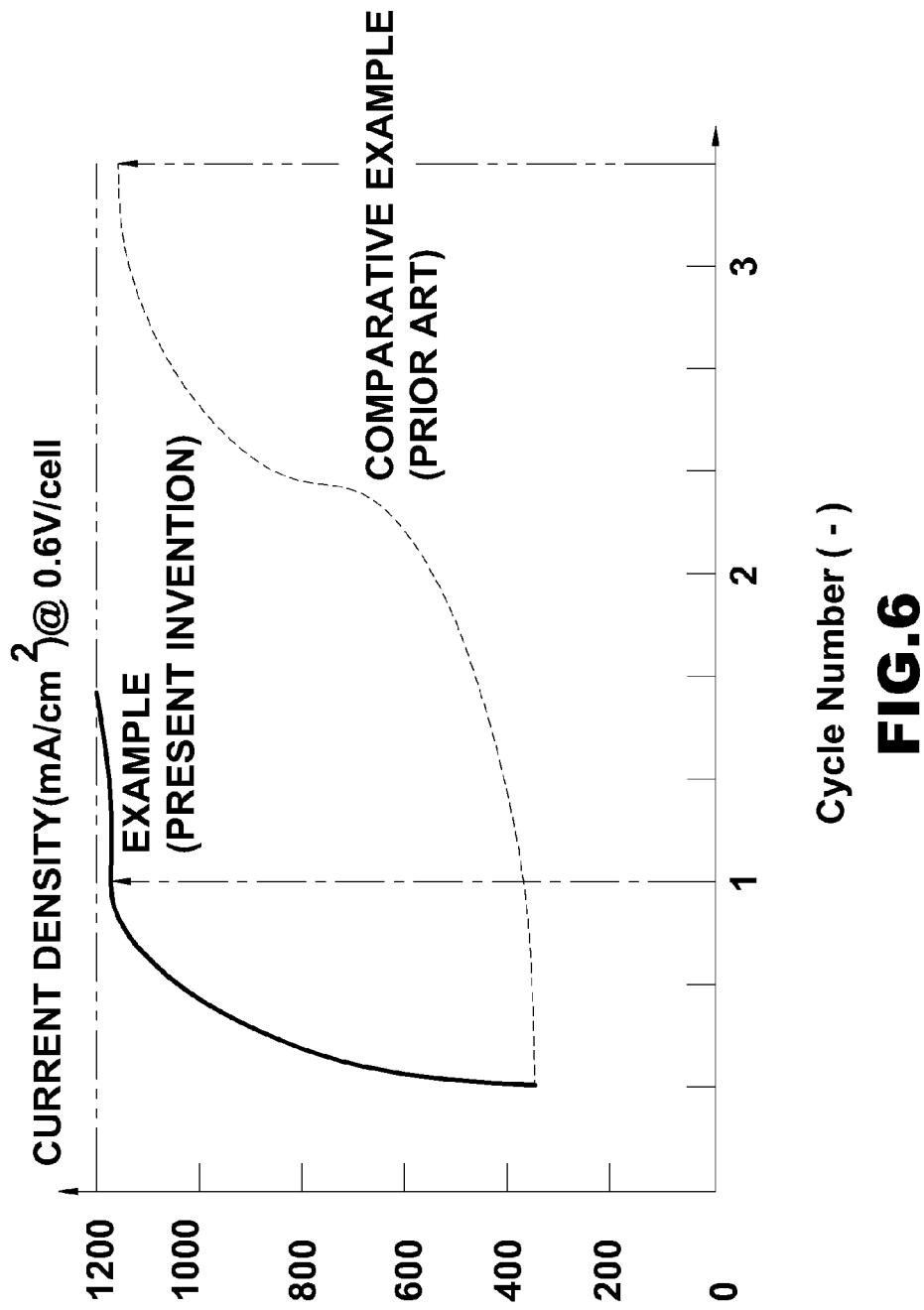
FIG. 6 is a graph comparing the activation times according to the conventional activation method and the activation method of the present invention.

As a result, as shown in FIG. 6, 3.3 cycles were required until the time point when the performance of the fuel cell was stabilized at a current density of 1,200 mA/cm$^2$ in the Comparative Example while only 1 cycle was required in the Example.

As described above, the present invention provides various effects including the following. During the active load sequence activation, the pressure difference between the air electrode and the fuel electrode is controlled such that the amount of water transported by back diffusion at the air electrode becomes larger than the amount of water transported by electro-osmotic drag at the fuel electrode, thus adjusting the amounts of water discharged from the air electrode and the fuel electrode to be equal to each other. As a result, the water produced at the air electrode is not discharged as it is, but directly used in the activation of a Nafion fluorine-containing polymer electrolyte membrane, such that the water concentration gradient of the polymer electrolyte membrane is minimized and, at the same time, the activation time of the fuel cell stack is reduced.

Moreover, with the reduction in the activation time of the fuel cell stack, it is possible to improve the productivity of the fuel cell stack and reduce the cost by reducing the amount of hydrogen gas used.

Furthermore, it is possible to prevent the crossover phenomenon due to the pressure difference between the air electrode and the fuel electrode, thus preventing deterioration of the fuel cell performance due to carbon corrosion.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for activating a fuel cell, the method comprising:
   initiating activation of a fuel cell stack by supplying hydrogen and oxygen to a fuel electrode and an air electrode, respectively, under predetermined operation conditions;
   measuring concentration changes in hydrogen and oxygen discharged from the fuel electrode and the air electrode together with water after initiating the activation of the fuel cell;
   applying a predetermined load sequence to the fuel cell;
   regulating a pressure difference ($\Delta P = P_{Cathode} - P_{Anode}$) between the air electrode and the fuel electrode to be a value greater than 0; and
   terminating the activation when the amounts of water discharged from the fuel electrode and the air electrode are equal to each other and the current density of the fuel cell stack is stabilized at a constant level.

2. The method of claim 1, wherein the pressure difference ($\Delta P = P_{Cathode} - P_{Anode}$) between the air electrode and the fuel electrode is regulated such that the amounts of water discharged from the fuel electrode and the air electrode become equal to each other by adjusting the amount of water transported by back diffusion at the air electrode to be larger than the amount of water transported by electro-osmotic drag at the fuel electrode.

3. The method of claim 1, wherein the pressure difference ($\Delta P = P_{Cathode} - P_{Anode}$) between the air electrode and the fuel electrode is regulated at 0.1 to 2.0 bar.

4. The method of claim 1, wherein, further comprising performing a warning step for safety when it is determined that a crossover phenomenon, in which oxygen at the air electrode crosses over to the fuel electrode or hydrogen at the fuel electrode crosses over to the air electrode, occurs if the concentration changes of hydrogen and oxygen at the fuel electrode and the air electrode exceed threshold values.

* * * * *